(12) United States Patent
Wroblewski

(10) Patent No.: US 6,889,598 B2
(45) Date of Patent: May 10, 2005

(54) BEVERAGE APPARATUS WITH POWER SWITCH COOLING SYSTEM AND METHOD

(75) Inventor: Leszek M. Wroblewski, Lake Forest, IL (US)

(73) Assignee: Food Equipment Technologies Company, Inc., Lake Zurich, IL (US)

(*) Notice: Subject to any disclaimer, the term of this patent is extended or adjusted under 35 U.S.C. 154(b) by 0 days.

(21) Appl. No.: 10/217,909

(22) Filed: Aug. 13, 2002

(65) Prior Publication Data

US 2004/0031395 A1 Feb. 19, 2004

(51) Int. Cl.[7] .............................................. A47J 31/00
(52) U.S. Cl. ............................ 99/275; 99/280; 99/281
(58) Field of Search ........................... 99/280, 281, 275, 99/279; 219/400, 437, 333, 330, 331; 392/449

(56) References Cited

U.S. PATENT DOCUMENTS

| | | | | |
|---|---|---|---|---|
| 4,917,005 A | * | 4/1990 | Knepler | .................. 99/280 |
| 5,019,690 A | * | 5/1991 | Knepler | .................. 219/400 |
| 5,144,543 A | * | 9/1992 | Striek et al. | .................. 363/16 |
| 5,402,705 A | * | 4/1995 | Bailleux et al. | .............. 99/281 |
| 5,619,902 A | * | 4/1997 | Schotte | .................. 99/281 |
| 5,732,563 A | * | 3/1998 | Bethuy et al. | ................ 62/139 |

FOREIGN PATENT DOCUMENTS

EP              0408116      *  1/1991

* cited by examiner

Primary Examiner—Reginald L. Alexander
(74) Attorney, Agent, or Firm—James W. Potthast; Potthast & Associates

(57) ABSTRACT

A beverage apparatus (10) having a liquid holding member (12,14,16) with an operating apparatus (42) for performing a particular function, such as heating water to make a beverage, is selectively connected through an electronic switching device (36) to a source of electrical power (40) that is mounted to the liquid holding member (12,14, 16) to convey heat away from the electronic switching device (36) and into the liquid. A radiating heat sink with radiating member (45,47) protects the switching device against potential damaging physical contact is also connected to the switching device (36) and radiates heat generated by the device into the atmosphere for additional cooling of the switching device (36).

37 Claims, 4 Drawing Sheets

BEVERAGE APPARATUS WITH POWER SWITCH COOLING SYSTEM AND METHOD

BACKGROUND OF THE INVENTION

1. Field of the Invention

This invention generally relates to beverage apparatus of the type having a liquid holding tank from which liquid, either water used to make a beverage or the beverage itself is held and more particularly such a beverage apparatus in which electrical power must be switched to an operating apparatus, such as a heat element or cooling device, by an electronic switching device, such as a triac or the like.

2. Discussion of the Prior Art

Commercial coffee brewers and tea brewers of the type that have a tank of heater water that is selectively passed through a brew basket containing ground coffee, or tea leaves or the like from which the beverage is brewed are well know. Reference may be made to U.S. Pat. Nos. 6,148,717 issued Nov. 21, 2000 to Lassota for "Beverage Maker with Intermittent Beverage Liquid Dispenser and Apparatus and Method for Uniform Contact of Brew Ingredient with Brew"; 5,331,885 issued Jul. 26, 1994 to Lassota for "Semiautomatic Beverage Maker and Method"; 5,000,082 issued Mar. 19, 1991, to Lassota for "Beverage Maker and Method of Making Beverage"; 5,943,944 issued Aug. 31, 1999, for "Brewing System with Hot Water Urn Flushing Apparatus"; and 6,044,753 issued Apr. 4, 2000, to Lassota for "Brwing System with Movable Dispenser Urn Mounting Apparatus and Method". In such brewers, an electrical heating element within the tank is connected to a source of electrical power through an electrical relay with mercury displacement heating element contactors. A problem with such contactors is the presence of the mercury that is potentially injurious to persons if they should come into direct contact with it due to breakage of mercury containment during use and which thus require special disposal procedures when the contactors are replaced or when the brewers themselves are discarded.

Accordingly, it is known to replace such contactors with electronic switches, such as triacs. A temperature sensor senses the temperature of the water in the hot water tank and when the sensed temperature decreases beneath a preselected temperature, a controller triggers the triacs into a conductive state. When the sensed temperature reaches another preselected temperature, the controller turns off the triac and the water is again allowed to cool. In many brewers, cold tap water from a public source at room temperature or colder is being added to the hot water tank while hot water is being drawing out of the tank to make the beverage, and thus the temperature can drop substantially beneath the preselected minimum temperature in a short time. A new brew cycle cannot be started until the temperature of the water is again raised to the preselected maximum temperature. It is therefore desired to raise the temperature to the maximum temperature as quickly as possible. Accordingly, it is necessary to pass relatively high quantities of electrical power through the triacs during the heating cycle.

Because of the nature semiconductors substantial heat is generated within the triacs during conduction when high power is being applied through the triac to the heating element. If the triac overheats beyond a certain level, it may be damaged and malfunction or cease to switch entirely. If the triac shorts out, then power may be continuously be applied to the hot water element and overheat the water beyond the preselected maximum temperature. In order to reduce this overheating of the triac it is known to provide the triac with a radiating heat sink that radiates heat into the atmosphere. Since the interior of the housings for the brewers are generally hotter than the room within which they are located it is known to mount the radiating heat sink spaced from the hot water tank and even on the outside of the housing. Because air is not highly heat conductive, and may, in fact, be considered an insulator, the heat sinks are relatively large, take up substantial space and are unsightly. Generally, the triac is in thermal contact with the radiating heat sink that, in turn, is in radiating heat contact with the atmosphere.

Such electrical power switches may also be found in hot tea and iced tea makers and also in beverage dispensers in general in which the beverage is heated, cooled, stirred or otherwise operated on by apparatus requiring substantial quantities of electrical power

SUMMARY OF THE INVENTION

Thus, the principal objective of the present invention is to provide a beverage apparatus such as beverage maker such like a coffee brewer, hot tea brewer or iced tea brewer, or beverage dispenser, and method in which an electronic power switch used to apply power to an operating apparatus of the beverage apparatus is cooled at least in part by conveying heat from the electronic power switch into the water used to make the beverage or, in the case of a dispenser, into the beverage itself.

This objective is achieved in part by providing a beverage apparatus having a liquid and a liquid holding tank, an operating apparatus for performing an operation in associated with the beverage when energized from a source of electrical power, with a power application system, having an electrical switching device interconnected between the source of power and the operating apparatus to selectively energize the operating apparatus, a controller for selectively actuating and deactuating the electrical switching device, and a thermal connector for thermally connecting the electrical switching device in heat passing relationship with the liquid. Preferably, the operating apparatus performs an operation of one of (a) heating the liquid, (b) cooling the liquid, (c) agitating the liquid, (d) whipping the liquid, (e) pumping the liquid, and (f) frothing the liquid and the electronic switching device is one of (a) a triac, (b) a power transistor, (c) a diac, (d) a diode and (e) any electronic switching device like the devices (a), (b), (c) and (d) that is useful for switching sufficient amounts of electrical power to the temperature altering means to enable a change to the temperature.

The objective is also achieved by providing a beverage maker having a water tank made of thermally conductive material and having an inside and an outside, and a temperature altering element for changing the temperature of the water and connectable to a source of electrical power, and means for passing water from the water tank through a beverage ingredient to make the beverage with a heating power application system having an electronic switching device for selectively connecting the source of electrical power to the temperature altering element to change the temperature of the water in the tank, and means for mounting the electronic switching apparatus directly to the outside of the water tank and in direct thermal communication with the water tank and any water in the water tank to draw heat by conduction away from the electronic switching device.

The objective is additionally obtained in part by providing in a beverage apparatus having a liquid and a liquid holding tank, an operating apparatus for performing an operation in associated with the beverage when energized from a source of electrical power, a method of applying power to the operating apparatus by performing the steps of selectively energizing the operating apparatus with an electronic switching device interconnected between the source of power and the operating apparatus, selectively actuating and deactuating the electrical switching device with a controller, and thermally connecting the electrical switching device in substantial heat passing relationship with the liquid. Preferably, the operating apparatus performs an operation of one of (a) heating the liquid, (b) cooling the liquid, (c) agitating the liquid, (d) whipping the liquid, (e) pumping the liquid, and (f) frothing the liquid. The beverage apparatus has a hot water brewer with a plurality of water holding members through which the water passes including a hot water tank with an inlet pipe and a fill valve and an outlet pipe with a dispense valve, and including the step of transferring heat from the electronic switching device to the water through one of the water holding members.

Additionally, the objective of the invention is achieved by provision in a beverage maker having a water tank for storing water between a top and a bottom, an ingredient holder, means for passing water from the water tank and through the ingredient to make a beverage of a method of changing the temperature of the water in the water tank comprising the steps of providing electrical power through an electronic switching device to a temperature altering apparatus to change the temperature of the water in the water tank, and conducting heat generated by the electronic switching device away from the electronic switching device and into the water tank and any water in the water tank through direct thermally conductive contact of the electronic switching device with the water tank. Preferably, the step of intermittently providing electrical power to the temperature altering apparatus includes the steps of measuring the temperature of the water in the tank, comparing the measured temperature with a preselected temperature, and controlling the intermittent providing of electrical power in accordance with the comparison. The step of measuring includes the step of measuring the temperature a level substantially spaced from the bottom of the tank and in which the temperature is controlled to be within a range between 160 degrees and 210 degrees Fahrenheit, and the temperature altering apparatus is an electrical heater used to raise the temperature of the water in the water tank, and in which the heat conducting step includes the step of conducting heat through the tank and the water within the tank through direct contact of the device with the tank at location substantially spaced from the top.

Furthermore, the object of the invention is partly achieved by providing a beverage apparatus having a liquid holding member and an operating apparatus for performing an operation and connectable to a source of electrical power with an operating apparatus power control system having an electronic switching device for selectively connecting the source of electrical power to the operating apparatus to energize the operating apparatus to perform the operation, and means for directly connecting the electronic device to the liquid holding member to cool the electronic device through conduction of heat through the liquid holding member and into any liquid contained within the holding member. Preferably, the connecting means includes a thermally conductive member with a portion that is sandwiched between the electronic switching device and the liquid holding member to convey heat from the electronic switching device directly to the liquid holding member and any liquid contained within the liquid holding member. A radiating heat conductive arm is in direct thermal contact with the thermally conductive member but spaced from the electronic switching device for radiating heat from the electronic switching device into atmosphere.

Obtainment of the objective is also acquired by providing in a beverage apparatus having a liquid holding member and an operating apparatus for performing an operation on the liquid and connectable to a source of electrical power, a method of controlling the operating apparatus by performance of the steps of selectively connecting the source of electrical power to the tank operating apparatus with an electronic switching device to actuate the operating apparatus to perform an operation on the liquid with an electronic switching device, and cooling the electronic switching device by transferring heat though a thermally conductive connector directly connecting the electronic switching device to the liquid holding member and any liquid within the holding member. Preferably, the thermally conductive member has a base that is sandwiched between the electronic switching device and the liquid holding member and including the steps of conveying heat from the electronic switching device directly to the liquid holding member and any liquid contained within the liquid holding member.

BRIEF DESCRIPTION OF THE DRAWINGS

The foregoing advantageous features will be described in detail and other features will be made apparent from the detailed description of a preferred embodiment which is given with reference to the several figures of the drawing, in which.

DETAILED DESCRIPTION

Figure 1:
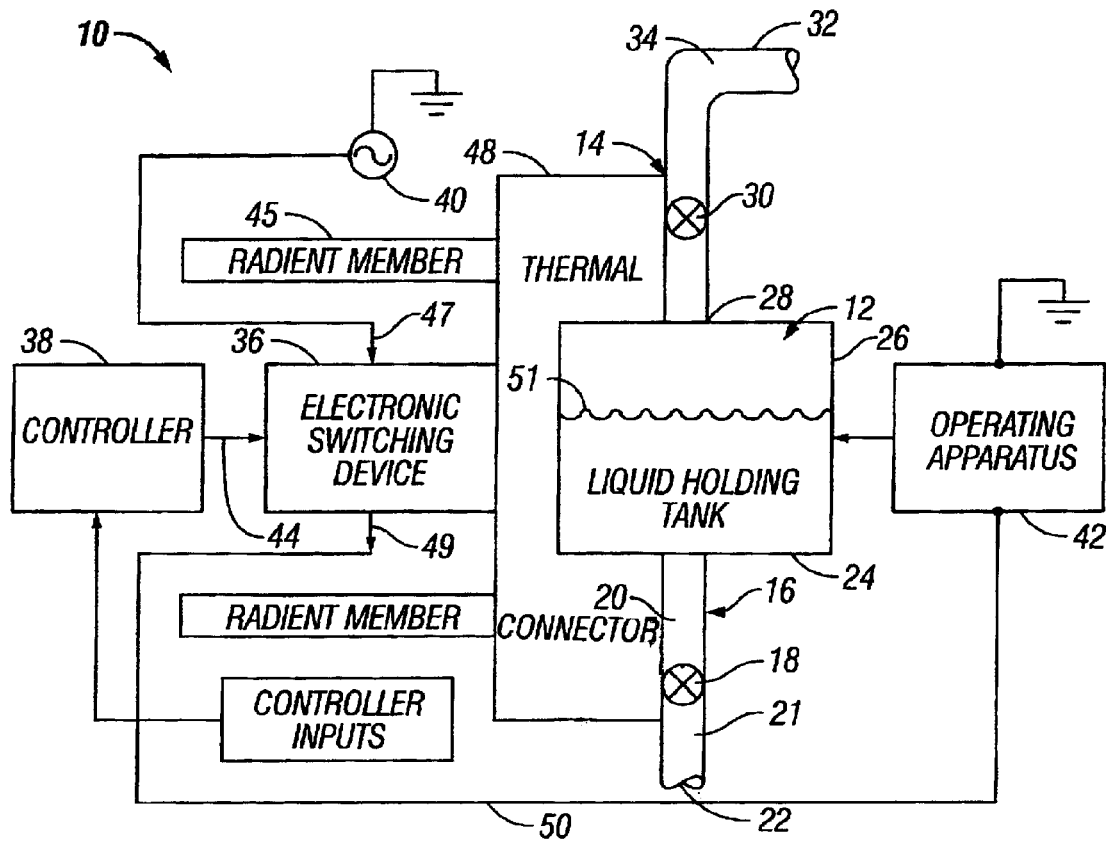
FIG. 1 is a general functional block diagram of the preferred embodiment of the beverage dispenser of the present invention.

Referring to FIG. 1, a general embodiment of the beverage apparatus 10 of the present invention is seen to include a liquid holding tank 12, an inlet pipe 14 for conveying fresh liquid from a source of liquid into the holding tank 12 and an outlet pipe 16 for conveying liquid out of the holding tank 12. As will be described below, the beverage apparatus 10 may be a beverage maker, such as a fresh, hot coffee brewer, a fresh hot tea brewer, a fresh iced tea brewer, and the like, in which hot water is passed through, and mixed with a beverage ingredient to make beverage. In such case, the brewer may also have a fixedly attached dispenser or a removable dispenser into which the freshly brewed beverage is passed. Alternatively, the invention has application to a stand-alone beverage dispenser in which beverage is stored for dispensing spaced apart from a beverage maker. In any event, the beverage apparatus has one or more members that contain or pass water, beverage or other liquid that can be used for cooling.

Each of the elements 12, 14 and 16 may be considered to be a liquid holding member. The outlet pipe 16 has a dispense valve 18 with a metal valve body (not shown), and a portion 20 of the pipe 16 between the holding tank 12 and the open end 22 of the pipe 16 is generally filled with liquid when the holding tank contains liquid when the dispense valve 18 is closed and is passing liquid when the valve 18 is open. The valve 18 should be considered to be a liquid holding member. While the outlet pipe 16 is shown attached to a bottom 24 of the tank 12, it should be appreciated that in many applications the outlet pipe 16 will be attached to a side 26 of the tank and adjacent to or at least closer to the top 28 of the tank 12, where if the water is heated the hottest water will be found. The inlet pipe 14 likewise has a fill valve 30 with a valve body (not shown), that, in the case of a beverage maker, is opened to add water to the liquid holding tank 12 from a pressurized source of water from a public water supply tap connected at the distal end 32 of the inlet pipe 14. While the inlet pipe is shown connected to the top of the holding tank for purposes of ease of illustration, in many applications the inlet pipe will make connection with the side of the holding tank adjacent the bottom 24 and beneath the liquid level 51 in the tank. Thus, the inlet pipe 14 on both sides of the valve generally contains water, and cold water is injected into the tank adjacent the bottom 24. When the valve 30 is closed, a portion 34 between the valve 30 and the distal inlet end 32 of the pipe 14 is generally filled with water. When the fill valve 18 is open then water passes through the portion 34. The portion is one of the locations where it may be desired to mount a switching device for purposes of cooling. However, the switch may also be connected to the portions of the inlet pipe 14 between the valve 30 and the liquid holding tank 26 or to the portion of the outlet pipe between the valve 18 and the distal end 22, particularly if these elements are made of metal or other highly conductive material and are in good thermal connection with the other liquid holding elements that holds the water in a relatively static condition rather than temporarily while passing through the element.

An electronic, semiconductor, electronic switching device 36, such as a triac, a diac, a diode, a power transistor or other like electronic power switch, is controlled by a controller 38 to selectively apply electrical power from a source of electrical power, such as standard voltage, or 240-VAC, 40 to an operating apparatus 42. In other applications, the voltage source may be a DC voltage supply. Depending upon the application, the operating apparatus 42 is an apparatus that operates on the liquid to achieve one or more of the operations of (a) heating the liquid, (b) cooling the liquid, (c) agitating the liquid, (d) whipping the liquid, (e) pumping the liquid, (f) frothing the liquid, (g) grinding ingredient to be mixed with the liquid. When the controller turns on the semiconductor switch, i.e. closes the switch, with an appropriate control signal applied to a control signal input terminal 44, then electrical current is passed through the electronic device between transconductive terminals 47 and 49 and along a power line 50 to and through the operating apparatus 42. When electrical power is applied to the operating apparatus 42, it becomes and performs the particular operation for which the operating apparatus 42 is designed.

The controller 38 determines when to trigger the electronic switching device into conduction to apply power to the operating apparatus 42 in accordance with a computer program and parameters stored within computer memory of the controller 38 and various controller inputs 46. The controller inputs 46 may include manual operator inputs that start an operation or which select a particular function that requires a particular operation. The controller inputs 46 may also be automatically generated by a suitable condition responsive sensor, such as by a temperature sensor, for sensing the temperature of the liquid in the liquid holding member 12, 14 or 16, as will be explained in greater detail below. Other inputs may come from other types of sensors such as a load cell, pressure sensor or other sensors that detect the absence of presence of liquid.

In accordance with the present invention, the electrical switching device 36 is mounted directly to one or more of the liquid holding members 12, 14 and 16 through the relatively highly thermally conductive thermal connector 48. As shown, the thermal connector 48 and the electronic switching device 36 mounted to the liquid holding tank by the connector 48 is in direct contact with both the liquid holding tank 12 and each of the tubes 14 and 16 and valves 18 and 30 and portions 34 and 21. The contact with the liquid holding tank 26 may be at the bottom 24, the side 26 or even the top 28, depending upon circumstances. Preferably, the thermal connector 48 makes connection with the water tank at a location beneath a level 51 of liquid beverage or water within the liquid holding tank.

In accordance with the invention, the electronic switching device 36 is in direct thermal contact with a member of the beverage maker or dispenser containing or passing water-like liquid at a temperature that is less than the highest temperature at which the electronic switch can properly operate. Preferably, the temperature of the liquid is substantially less than the highest temperature that the electronic switch 36 can properly operate, and instead is much lower than the maximum operating temperature to keep the temperature of the switching device 36 at an optimal temperature for maximum efficiency and longer useful life. In the case of a hot beverage brewer, it has been learned that the temperatures near to and on the bottom are sufficiently low to provide a good conductive thermal sink for a semiconductor switch driving a heating element within the holding tank 26. The highest level along the side of the 28 of the tank 12 can be determined empirically by making temperature measurements along the side during the heating phase after hot water has been drained and cold water added. The coldest temperature will also generally be found at the bottom 24 of a refrigerated tank or an unheated tank, but in such case locating the device at a higher level than the bottom may still achieve the same degree of cooling as with attachment of the switching device to the bottom of a hot water tank.

The lowest temperature in the case of a hot water tank will generally be at the very bottom 24. Preferably, for highest heat conductivity, the tank 13 or any of the other liquid holding members is made of highly conductive material such as stainless steel, aluminum or other metal or metal composite. In such case, a metal mounting base of the switching device may serve as the sole thermal connector to directly connect the switching device to the water tank.

Direct thermal connection is preferably enhanced by a metal base of greater surface area than the base that is sandwiched between the water tank and the switching device whether or not having a metal base. If the water tank is made of plastic, such as high-temperature-use polymer, then the conductive metal base is preferably enlarged to enhance the conduction of heat from the switching device to the tank and the water contained within the tank and to improve the mechanical connection, The conductive metal base may also be connected to radiating fins spaced from the switching device for radiating heat into the atmosphere. Preferably, the exact dimensions depend the amount of power being switched, the thermal characteristics of the switching device (which usually can be obtained from the manufacturer), the temperature of the water opposite the outside location on the water tank at which the switching device is mounted, and the like, all of which can be determined experimentally.

Figure 2:
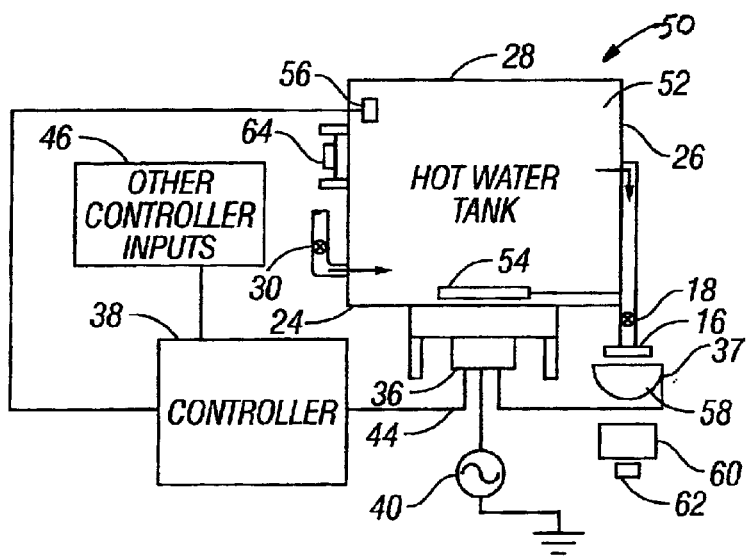
FIG. 2 is a functional block diagram of the preferred embodiment of the beverage apparatus as embodied in a coffee brewer or tea brewer in which the water in the water tank is heated.

Referring now to FIG. 2, a preferred form of the invention, as embodied in a hot coffee brewer, a hot tea brewer or an iced tea brewer or other hot beverage brewer 50 is shown in which some of the parts corresponding to those of the block diagram of FIG. 1 have been give the same reference number. As seen, the liquid holding tank 12 of FIG. 1 is a hot water tank 52 and the operating apparatus 42 is a heating element 54 contained within the tank to heat the water in the hot water tank 52. A temperature sensor 56 detects the temperature of the hot water in the hot water tank 52. This temperature information is passed to the controller 38 along with information from the other controller inputs 46 and is used by the controller 38 to determine when the switching device 36, preferably a triac, should be turned on. The controller also controls the outlet valve, dispense valve, or brew valve 18 (connections not shown) to dispense hot water through the outlet 16 into an ingredient holder, such as a brew basket 58 containing the beverage ingredient to be brewed, ground coffee in the case of a hot coffee brewer, and tea leaves or ground tea in filter bags, in the case of a hot tea brewer or a fresh iced tea brewer. In the case of a hot coffee brewer or a hot tea brewer, the hot water is passed through the beverage ingredient contained within the brew basket 58, and the resulting freshly brewed beverage is passed out of a drain hole in the bottom of the brew basket 58 and into a dispensing container 60. The dispensing container may be a small hand held beaker or a relatively large insulated dispenser with a faucet for dispensing beverage into cups or other smaller serving urns or the like. If a warming heater 62 is provided beneath the dispensing container, such as may be the case for a non-insulated, hand held beaker, then another switching device 64 used to connect electrical power from the source 40 (connections to controller and power supply not shown) to the warming heater 62 is preferably also attached to the hot water tank. The connection is either at a location on the side 26 adjacent the bottom 24, or at least spaced from the top 28, where the water is hottest, or on the bottom 24, where the water is coolest, next to the switching device 36.

Preferably, as hot water is being dispensed through the outlet 18 during a brew cycle from an upper portion of the hot water tank 52, cold tap water is being added to a relatively lower portion of the hot water tank 26, preferably adjacent the bottom 24 and adjacent the heating element 54. When this occurs the temperature of the water drops. When the temperature sensed by the temperature sensor 56 is detected by the controller 38 to have decreased beneath a preselected minimum temperature, the controller 38 sends a trigger signal to the electronic switch 36 to cause it to turn on and apply electrical power to heating element 54 to reheat the water and raise the temperature. When the controller 38 detects that the temperature sensed by the temperature sensor 56 has increased to a preselected maximum temperature, then it turns off the electronic switching device 36 to remove power from the electrical heating element 54. Thus, in accordance with the present invention, the electronic switching device is turned on when the water is at the lowest temperature to enhance cooling of the switching device 36 by the water when enhanced cooling is needed the most. Likewise, when the water is hottest and thus is relatively less effective for cooling, then the switching device 36 is turned off to reduce the amount of cooling required.

Figure 3:
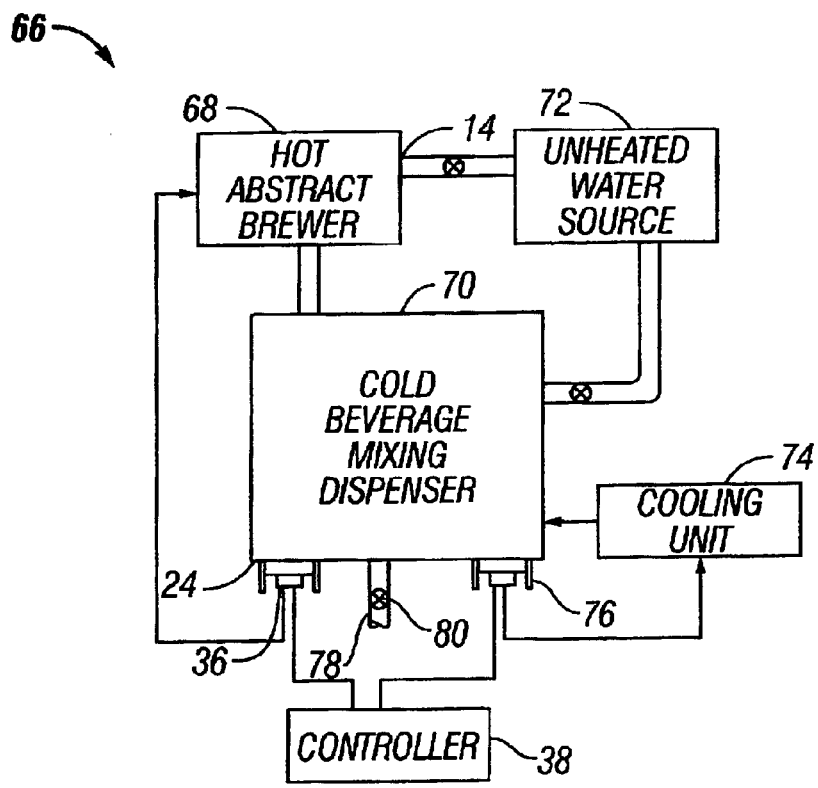
FIG. 3 is a functional block diagram of the preferred embodiment of the beverage apparatus as embodied in an iced beverage brewer.

Referring now to FIG. 3, the invention is shown as embodied in a freshly brewed iced drink maker 66. In the iced drink maker, such as a freshly brewed iced tea maker or a freshly brewed iced coffee maker, there is a hot abstract brewer 68 that has the same components as the hot drink brewer of FIG. 2 and which operate in the same way as described above, except that instead of the entire beverage being brewed in the brew basket, only a concentrated amount is brewed with the hot water from the hot water tank. The hot beverage abstract is then drained from the brew basket into a cold beverage, mixing dispenser 70. Unheated water from an unheated water source 72, such as a cold water line, in addition to passing cold water to the hot water tank of the hot abstract brewer 68 also passes cold water to the cold beverage, mixing dispenser 70. The cold water is mixed with the hot beverage abstract from the hot abstract brewer 68 to produce the beverage, such as iced tea or iced coffee. The temperature of the cold water in the cold beverage, mixing chamber is substantially less than the water of even the lowest part of the hot water tank of the hot water abstract brewer 68. Accordingly, in keeping with the invention, if the dispenser remains attached to the hot abstract brewer 68 after the beverage is made and the beverage is dispensed from the same location at which the beverage is made, then the electronic switching device 36 used to control the application of power to the heating element of the hot abstract brewer 68 may be attached to the outside surface of the cold beverage mixing dispenser 70 for improved cooling because of the cooler temperature of the beverage in the cold beverage mixing dispenser 70 relative to the hot water in the hot water tank of the brewer 68. Likewise, if there is a cooling unit, then another electronic switching device 76 for controlling application of electrical power to the cooling unit 74 may also be attached to the cold beverage, mixing dispenser 70 to be cooled by the cold beverage in the mixing dispenser 70. The dispenser also has an outlet tube 78 and the electronic switching devices 36 and 76 may be attached to the outlet tube 78 or to a dispense valve 80 connected in line with the outlet tube 78. Alternatively, if the cold beverage mixing dispenser is designed to be removed from the brewer 70 and the cooling unit 74 for dispensing and thus cannot be attached to the cold beverage mixing dispenser 70, then the electronic switching devices 36 and 76 are attached to the hot water tank of the hot abstract brewer 68, as discussed above with respect to FIG. 2, or to the water pipes or valves, preferably the cold water inlet pipe or valve, as discussed above with respect to FIG. 1. Alternatively, each removable dispenser carries the switching device that is releasably connected with the circuit of the heater of the hot abstract brewer 68.

If the cold beverage mixing dispenser 70 of FIG. 3, or if the hot beverage drink dispenser 60 of FIG. 2, is removable from the brewer but carries either a cooling element or a heating element to maintain a temperature of the premixed beverage, then the electronic switches that are used to control application of power to these elements are preferably attached to the portable dispenser or the outlet pipe of the portable dispenser. Likewise, if the drink dispenser has a mixing motor or other operating apparatus 42, as discussed above with respect to FIG. 1, the control switches are likewise attached to the dispenser body. In the case of a dispenser that is not automatically filled as the beverage is dispensed it is more important to mount the electronic switches 36 and 76 to the bottom 24, since as the beverage is depleted the sides above the bottom lose direct contact with the beverage.

Figure 4:
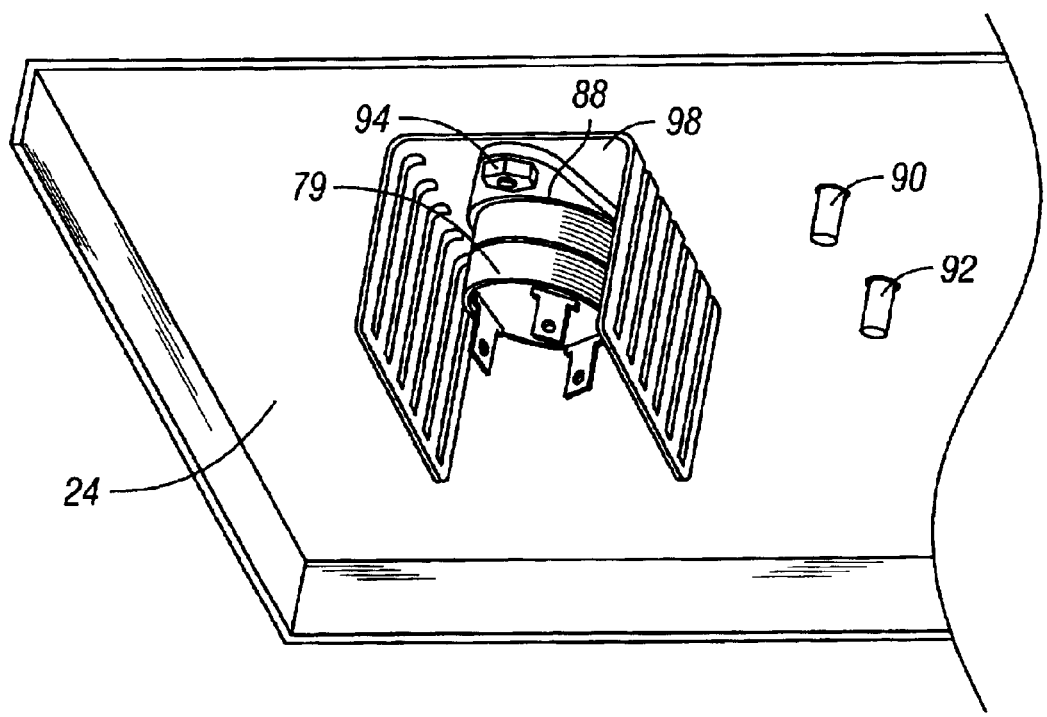
FIG. 4 is a perspective view of a triac mounted to the bottom of a water tank in accordance with the present invention and a pair of threaded mounting posts used to mount a second triac.
Figure 5:
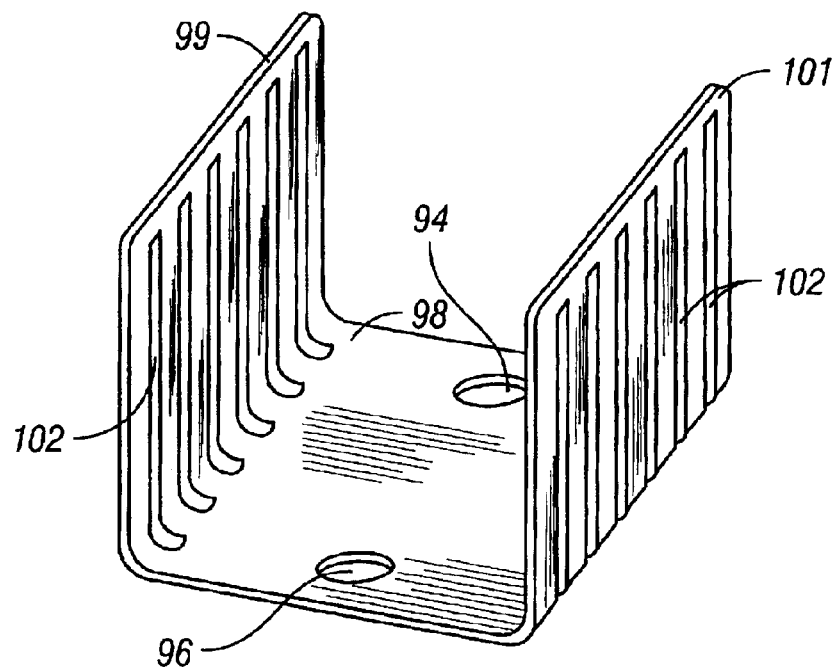
FIG. 5 is a perspective view of the radiating heat sink of FIG. 4 apart from the triacs to illustrate the base and mounting holes in the base of the heat sink for receipt of the mounting posts of FIG. 4.
Figure 7:
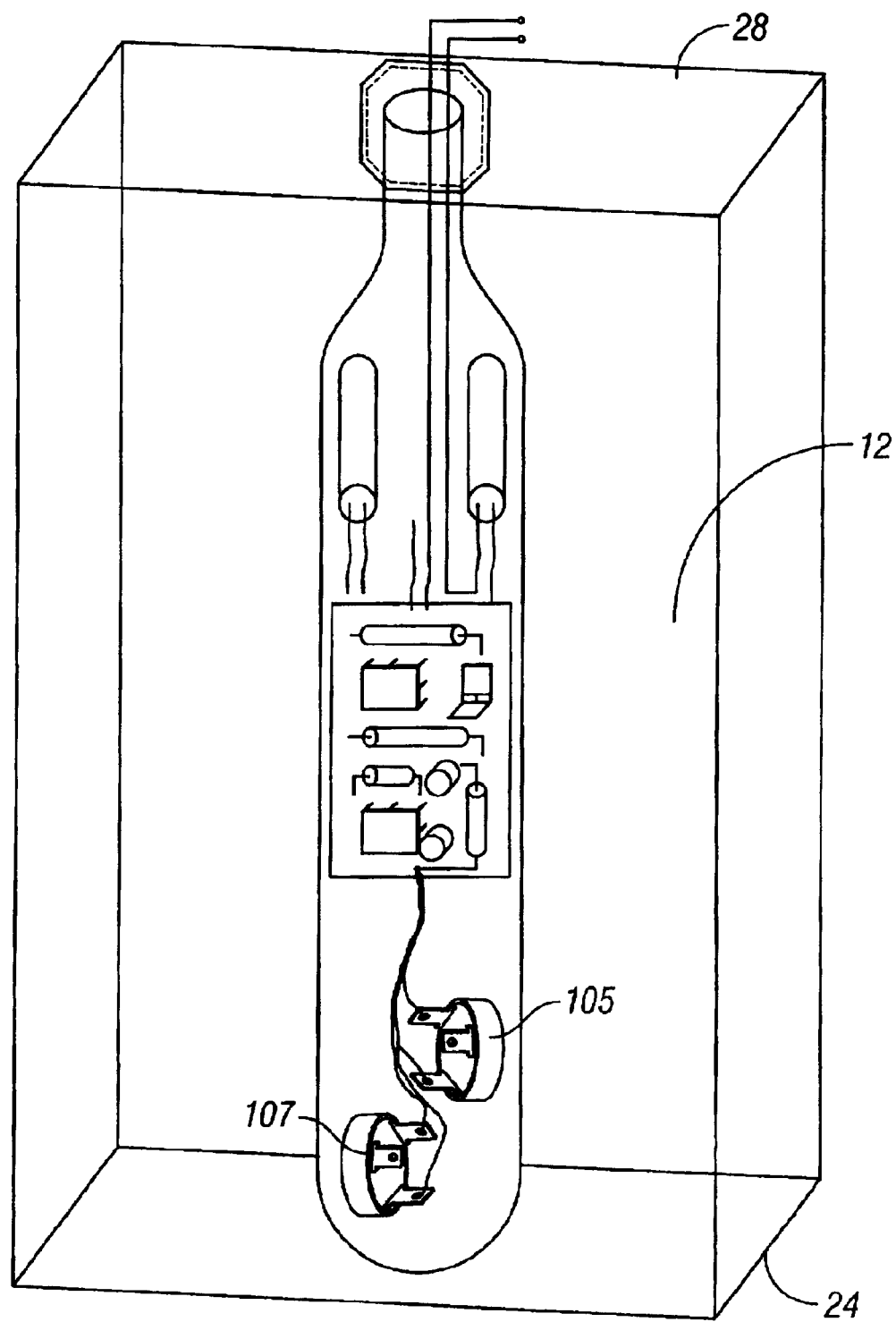
FIG. 7 is a schematic illustration of an embodiment of the invention in which the circuit of FIG. 6 is protectively encased within a heat conductive housing that, in turn, is submerged within the hot water tank.

Referring now to FIGS. 4 and 5, a preferred mounting for the electronic switches is illustrated. As seen, a triac 79 with a cylindrical body 80 is mounted to the bottom 24 of either a water tank or beverage dispenser, such as described above with respect to FIGS. 1–3. The mounting would be substantially the same for mounting the triac to one of the pipes or valve bodies as described above with respect to FIGS. 1–3 except for obvious changes in configuration to accommodate mounting to cylindrical or other non-flat surfaces. The cylindrical body 80 has a top with three terminals: a terminal 82 for connection with a trigger input signal from the controller 38, and two transconductive terminals 84 and 86 for connection with the source of power 40 and the operating apparatus 42. A bottom of the triac 79 is force fitted into a laterally extending mounting collar 88 and additionally held in position by epoxy cement or the like. The mounting collar 88 is preferably made of metal and has a bottom surface in contact with the bottom 24 that is larger in area than the bottom of the cylindrical body 80 to enhance heat transfer, from the body 80 and the bottom 24 of the tank. Spot welded to the bottom 24 of the tank are a pair of threaded mounting posts 90 and 92 that are received through aligned mounting holes on opposite sides of the heat conductive collar 88. The collar 88 is then releasably secured to the posts 90 and 92 by internally threaded nuts 94. Depending upon circumstances, the collar 88 may provide the only part of the thermal connector 48, FIG. 1.

However, preferably, the thermal connector 48 also includes a thermally conductive base member 96 that is sandwiched between the collar 88 and the triac 79, on the one hand, and the bottom 24, on the other hand. The base is preferably made of a highly conductive metal or metal composite, such as aluminum, and has an area in contact with the bottom 24 that is substantially larger than the cross section of the cylindrical body 88 and the mounting collar 88 to enhance thermal heat conductivity from the triac 78 to the bottom 24 of the tank.

Referring also to FIG. 5, the base member 96 has a pair of mounting holes 94 and 96 that align with the mounting holes in the collar 88 and with the mounting posts 90 and 92. The mounting posts 90 and 92 are received through the mounting holes 94 and 96 and through the mounting holes in the collar 88 and the nuts 94 then are tightened to securely attach the collar 88 and the base member 96 pressed against the bottom 24 to maximize contact and thereby maximize thermally conductive contact with the body of the triac 79. The mounting posts and the nuts thus serve to attach both the triac 79 and the conductive base 98 to the bottom 24.

In accordance with another aspect of the invention the base member 96 is directly connected to a pair of heat radiating fin members 99 and 101 that radiate heat from the base to atmosphere for enhanced heat dissipation. Preferably, the heat radiating fin members 99 and 101 have a plurality of air slots 102 to increase surface area and a length that is coextensive with the opposite sides of the base.

In addition, the height of the heat radiating fins 99 and 101 extends beyond the height of the cylindrical body of the triac 79 and the terminals to provide a protective barrier against potential accidental physical bumping or other potentially damaging contact with the triac 79 or the terminals. Likewise, preferably the triac 79 is located between the pair of heat radiating fin members 99 and 101 to protect the triac 79 against accidental lateral contact with the sides of the triac 79 and to symmetrically locate the two fins 99 and 101. The fins 98 and 101 may also be extended or other fins added to substantially entirely surround the triac 79.

Figure 6:
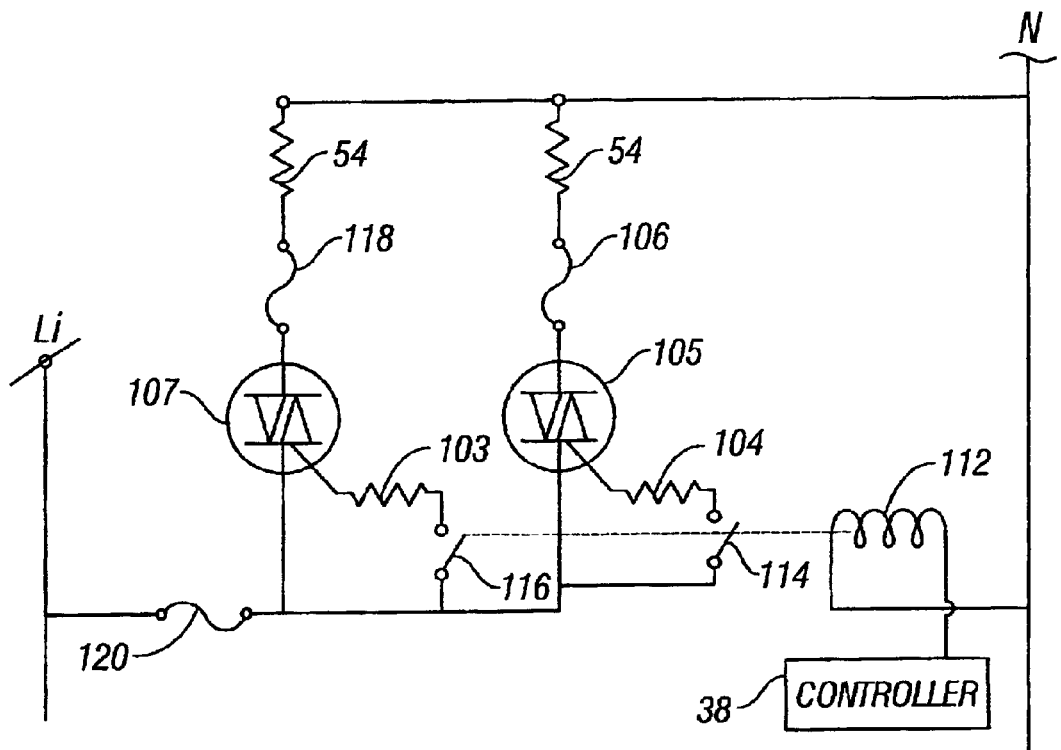
FIG. 6 is a schematic wiring diagram of the circuit in which the triacs of FIG. 4 are used.

Referring to FIG. 6, in the case of the electronic switch being a pair of triacs 105 and 107, there are two trigger circuits each with a bias resistor 104 and 103 of 330-ohms selectively switched in and out of circuit by the controller 38 through a relay switch 110 with a pair of contacts 114 and 116. Limit thermostat 106, 118 and 120 protects the circuit against excessive temperature. One circuit of FIG. 6 is used for each phase of the AC electrical power and thus there are two triac circuits for a two-phase power supply. A single multi-contact relay 112 is used to trigger all of the triacs 105 and 106 in response to a trigger signal from the controller. While other elements can be used for the triac 78, a BTA/BTB40-600B AO35 Phi Series triac made by SGS-Thomson Microelectronics has been found to work successfully. With this triac mounted to a water tank, the Phi Series triac was used successfully to apply 120 VAC power to a pair of 2,300 watt heating elements 54 used to heat the water in the tank. Using the technique of the invention described above, the temperature of the triacs was kept under 180-degrees Farenheit. As the water temperature decreased, it was observed that the peak and average maximum temperature of the triac were also lowered, but even at a water temperature of 180degrees there was substantial cooling of the triacs.

Thus, it is seen that in accordance with the method of the invention as applied to a beverage apparatus having a liquid and a liquid holding tank, an operating apparatus for performing an operation in associated with the beverage when energized from a source of electrical power, the electrical power is applied to the operating apparatus by performing the steps of (a) selectively energizing the operating apparatus with an electronic switching device interconnected between the source of power and the operating apparatus, electively actuating and deactuating the electrical switching device with a controller, and (b) thermally connecting the electrical switching device in substantial heat passing relationship with the liquid. This method can be applied when the operating apparatus performs any one of the operations of (a) heating the liquid, (b) cooling the liquid, (c) agitating the liquid, (d) whipping the liquid, (e) pumping the liquid, and (f) frothing the liquid.

In a beverage maker having a water tank for storing water between a top and a bottom, an ingredient holder, means for passing water from the water tank and through the ingredient to make a beverage, the invention provides a method of changing the temperature of the water in the water tank by performance of the steps of (1) providing electrical power through an electronic switching device to a temperature altering apparatus to change the temperature of the water in the water tank, and (2) conducting heat generated by the electronic switching device away from the electronic switching device and into the water tank and any water in the water tank through direct thermally conductive contact of the electronic switching device with the water tank.

The method of controlling the operating apparatus in a beverage apparatus having a liquid holding member and an operating apparatus for performing an operation on the liquid and connectable to a source of electrical power is performed by the steps of: (1) selectively connecting the source of electrical power to the tank operating apparatus with an electronic switching device to actuate the operating apparatus to perform an operation on the liquid with an electronic switching device (2) cooling the electronic switching device by transferring heat though a thermally conductive connector directly connecting the electronic switching device to the liquid holding member and any liquid within the holding member.

As part of the method of the present invention it should be also appreciated that in addition to the triacs or other electronic switches being cooled through means of a thermal connection through a conductive body with the liquid in the liquid holding tank 12 or the liquid in the pipes 14 and 16, or liquid in the metal valve bodies of the valves 30 or 18, the heat generated by the is conveyed or transferred to the liquid and thus heats the liquid. Thus, in keeping with one aspect of the invention, in the case of a hot beverage maker, the heat generated by the power switching devices is not wasted but is used to assist in heating the liquid in the holding tank 12.

As seen in FIG. 2, the circuit of FIG. 6 may be protectively encased within a circuit housing that, in turn, is directly submerged within the interior of the hot water tank 12 between the bottom 28 and the top side 24. This enables dissipation of the heat directly through the circuit housing into the fluid within the interior of the tank 12 without the need for first passing through the sides 24 or bottom 28 of the tank 12.

While a particular embodiment has been disclosed in detail for purpose of illustration, it should be appreciated that many variations may be made to embodiments disclosed with departing from the broad concepts of the invention as defined in the appended claims. For example, while a mounting means including a plate sandwiched between the triac and the hot water tank has been shown, it should be appreciated that the triac could be mounted directly to the tank without an intervening mounting member. Likewise, while a particular mounting member or thermal connector for thermal connection to a pipe or valve body or side of the holding tank has not been illustrated, it should be obvious that they will need to conform to the particular configuration and dimensions of the pipe or valve body or tank side in question but will otherwise be like the particular thermal connector shown for mounting of the triac to the bottom of the holding tank. While the particular thermal connector also has radiant arm, such arms are not necessary for transfer of the heat into the liquid. Reference should therefore be made to the claims.

What is claimed is:

1. In a beverage apparatus having a liquid and a liquid holding tank, an operating apparatus for performing an operation in associated with the beverage when energized from a source of electrical power, the improvement being a power application system, comprising:
   an electrical switching device interconnected between the source of power and the operating apparatus to selectively energize the operating apparatus;
   a controller for selectively actuating and deactuating the electrical switching device;
   a thermal connector for thermally connecting the electrical switching device in heat passing relationship with the liquid; and
   a heat conductive radiant member connected to the heat conductive member and spaced from the electronic switching device to radiate heat from the heat conductive member into atmosphere.

2. In a beverage apparatus having a liquid and a liquid holding tank, an operating apparatus for performing an operation in associated with the beverage when energized from a source electrical power, the improvement being a power application system, comprising:
   an electrical switching device interconnected between the source of power and the operating apparatus to selectively energize the operating apparatus;
   a controller for selectively actuating and deactuating the electrical switching device;
   a thermal connector for thermally connecting the electrical switching device in heat passing relationship with the liquid; and in which
   the operating apparatus performs an operation of one of (a) agitating the liquid, (b) whipping the liquid, and (c)frothing the liquid.

3. The beverage apparatus of claim 2 in which the beverage apparatus has a hot water brewer with a plurality of water holding members through which the water passes including a hot water tank with an inlet pipe and a fill valve and an outlet pipe with a dispense valve and the electronic switching device is mounted in heat transferring relationship with at least one of the water holding members.

4. The beverage apparatus of claim 3 in which the at least one of the water holding members to which the electronic switching device is mounted is made of metal.

5. The beverage apparatus of claim 3 in which the at least one of the water holding members to which the electronic switching device is mounted is the hot water tank.

6. The beverage apparatus of claim 3 in which the hot water tank has a bottom and the switching device is mounted to the bottom.

7. The beverage apparatus of claim 3 in which the operating apparatus is an electrically powered heating element for heating the water in the hot water tank, the hot water tank has a bottom and side portions adjacent the bottom, and the electronic switching device is mounted to the side portions adjacent the bottom.

8. The beverage apparatus of claim 2 in which the electronic switching device is one of (a) a triac, (b) a power transistor, (c) a diac, (d) a diode and (e) any electronic switching device like the devices (a), (b), (c) and (d) that is useful for switching sufficient amounts of electrical power to the temperature altering means to enable a change to the temperature.

9. The beverage apparatus of claim 2 in which the electronic switching device is one of (a) a triac, (b) a power transistor, (c) a diac, (d) a diode and (e) any electronic switching device like the devices (a), (b), (c) and (d) that is useful for switching sufficient amounts of electrical power to the temperature altering means to enable a change to the temperature.

10. The beverage apparatus of claim 2 in which the thermal connector includes a mounting fastener attached to the outside surface of a liquid holding member for releasably attaching the electronic switching device to the liquid holding member.

11. The beverage apparatus of claim 2 in which the thermal connector includes a metal heat conductive member sandwiched between the electronic switching device and a liquid holding member for conveying heat from the electronic switching device to the liquid holding member.

12. In a beverage maker having a water tank made of thermally conductive material and having an inside and an outside, and a temperature altering element for changing the temperature of the water and connectable to a source of electrical power, and means for passing water from the water tank through a beverage ingredient to make the beverage, the improvement being a heating power application system, comprising:

an electronic switching device for selectively connecting the source of electrical power to the temperature altering element to change the temperature of the water in the tank; and means for mounting the electronic switching apparatus directly to the outside of the water tank and in direct thermal communication with the water tank and any water in the water tank to draw heat by conduction away from the electronic switching device. including metal fasteners fixedly attached to the outside of the water tank for releasably attaching the electronic switching device to the water tank.

13. The beverage maker of claim 12 in which the electronic switching device is one of (a) a triac, (b) a power transistor, (c) a diac, (d) a diode and (e) any electronic switching device like the devices (a), (b), (c) and (d) that is useful for switching sufficient amounts of electrical power to the temperature altering means to enable a change to the temperature.

14. The beverage maker of claim 12 including a radiating heat sink attached to the electronic switching device for radiating heat from the switching device into atmosphere.

15. In a beverage maker having a water tank made of thermally conductive material and having an inside and an outside, and a temperature altering element for changing the temperature of the water and connectable to a source of electrical power, and means for passing water from the water tank through a beverage ingredient to make the beverage, the improvement being a heating power application system, comprising:

an electronic switching device for selectively connecting the source of electrical power to the temperature altering element to change the temperature of the water in the tank; and means for mounting the electronic switching apparatus directly to the outside of the water tank and in direct thermal communication with the water tank and any water in the water tank to draw heat by conduction away from the electronic switching device including a radiating heat sink attached to the electronic switching device for radiating heat from the switching device into atmosphere including an outwardly extending heat radiating member that is physically attached and in thermal communication with the water tank and the electronic switching device.

16. The beverage maker of claim 15 in which the outwardly extending heat radiating member extends outwardly from the water tank by an amount greater than that of the electronic switching device to protect the electronic switching device against accidental damage from physical contact with potentially damaging elements.

17. The beverage maker of claim 16 in which the radiating heat sink has another outwardly extending heat radiating member that is spaced from the one outwardly extending heat radiating member and the electronic switching device is protectively contained between the one heat radiating member and the other heat radiating member.

18. The beverage maker of claim 17 in which the radiating heat sink has a heat conductive base interconnecting the one heat radiating member and the other heat radiating member that is held against the outside surface of the water tank and sandwiched between the water tank and the switching device.

19. In a beverage maker having a water tank made of thermally conductive material and having an inside and an outside, and a temperature altering element for changing the temperature of the water and connectable to a source of electrical power, and means for passing water from the water tank through a beverage ingredient to make the beverage, the improvement being a heating power application system, comprising:

an electronic switching device for selectively connecting the source of electrical power to the temperature altering element to change the temperature of the water in the tank; and means for mounting the electronic switching apparatus directly to the outside of the water tank and in direct thermal communication with the water tank and any water in the water tank to draw heat by conduction away from the electronic switching device including a radiating heat sink attached to the electronic switching device for radiating heat from the switching device into atmosphere and in which the radiating heat sink is fastened to the water tank by means of fasteners that are attached to the outside of the water tank and extend through aligned mounting holes in both the heat radiating member and the switching device.

20. The beverage maker of claim 19 in which the temperature altering element is an electrical heating element to raise the temperature of the water in the water tank.

21. The beverage maker of claim 19 in which the temperature altering element is a cooling element to lower the temperature of the water in the tank when energized by the electronic switching device.

22. In a beverage maker having a water tank made of thermally conductive material and having an inside and an outside, and a temperature altering element for changing the temperature of the water and connectable to a source of electrical power, and means for passing water from the water tank through a beverage ingredient to make the beverage, the improvement being a heating power application system, comprising:

an electronic switching device for selectively connecting the source of electrical power to the temperature altering element to change the temperature of the water in the tank; and means for mounting the electronic switching apparatus directly to the outside of the water tank and in direct thermal communication with the water tank and any water in the water tank to draw heat by conduction away from the electronic switching device and in which the water tank is a hot water tank with a bottom and a side wall and the mounting means attaches the electronic switching device to the side wall adjacent the bottom.

23. In a beverage maker having a water tank made of thermally conductive material and having an inside and an outside, and a temperature altering element for changing the temperature of the water and connectable to a source of electrical power, and means for passing water from the water tank through a beverage ingredient to make the beverage, the improvement being a heating power application system, comprising:

an electronic switching device for selectively connecting the source of electrical power to the temperature altering element to change the temperature of the water in the tank;

means for mounting the electronic switching apparatus directly to the outside of the water tank and in direct thermal communication with the water tank and any water in the water tank to draw heat by conduction away from the electronic switching device; and another electronic switching device for selectively connecting the source of power to the temperature altering element to change the temperature of the water in the tank; and another means for mounting the other electronic switching apparatus to the outside of the water tank and in direct thermal communication through the other mounting means with the water tank and any water in the water tank with the to draw heat by conduction away from the electronic switching device.

24. The beverage maker of claim 23 in which the thermally conductive material of the water tank is metal.

25. The beverage maker of claim 23 in which the mounting means is made of metal.

26. The beverage maker of claim 23 in which the temperature altering device is located within the water tank.

27. The beverage maker of claim 23 in which the in which the beverage being made is one of (a) freshly brewed coffee, (b) freshly brewed ice tea.

28. In a beverage apparatus having a liquid and a liquid holding tank, an operating apparatus for performing an operation in associated with the beverage when energized from a source of electrical power, the improvement being a method of applying power to the operating apparatus, comprising the steps of:

selectively energizing the operating apparatus with an electronic switching device interconnected between the source of power and the operating apparatus;

selectively actuating and deactuating the electrical switching device with a controller;

thermally connecting the electrical switching device in substantial heat passing relationship with the liquid; and conveying heat from the electronic switching device to atmosphere through a heat conductive radiant member connected to the heat conductive member and spaced from the electronic switching device to radiate heat from the heat conductive member into atmosphere.

29. The method of claim 28 including the step of protecting the electronic switching device against mechanical damage with the heat conductive radiant member.

30. In a beverage apparatus having a liquid holding member and an operating apparatus for performing an operation and connectable to a source of electrical power, the improvement being an operating apparatus control circuit, comprising:

an electronic switching device for selectively connecting the source of electrical power to the operating apparatus to energize the operating apparatus to perform the operation; and means for directly connecting the electronic device to the liquid holding member to cool the electronic device through conduction of heat through the liquid holding member and into any liquid contained within the holding member including a thermally conductive member with a portion that is sandwiched between the electronic switching device and the liquid holding member to convey heat from the electronic switching device directly to the liquid holding member and any liquid contained within the liquid holding member; and a radiating heat conductive arm in direct thermal contact with the thermally conductive member but spaced from the electronic switching device for radiating heat from the electronic switching device into atmosphere.

31. The beverage apparatus of claim 30 in which the beverage apparatus is a beverage maker and the liquid holding member is one of (a) an inlet water pipe connectable with a public source of water and a water holding tank, (b) a liquid holding tank for holding liquid to be mixed with a beverage ingredient to make a beverage, and (c) an outlet pipe for conveying water from the water tank to a beverage ingredient holder for making the beverage.

32. The beverage apparatus of claim 30 in which the beverage apparatus is a beverage dispenser and the liquid holding member is one of (a) a beverage holding tank, (b) an outlet pipe for conveying beverage out of the beverage holding tank.

33. The beverage apparatus of claim 30 in which the liquid operating apparatus operates on the liquid to achieve one of the operations of (a) heating the liquid, (b) cooling the liquid, (c) agitating the liquid, (d) whipping the liquid, (e) pumping the liquid, and (f) frothing the liquid when electrical power is applied by the electronic switching device.

34. In a beverage apparatus having a liquid holding member and an operating apparatus for performing an operation on the liquid and connectable to a source of electrical power, the improvement being a method of controlling the operating apparatus, comprising the steps of:

selectively connecting the source of electrical power to the tank operating apparatus with an electronic switching device to actuate the operating apparatus to perform an operation on the liquid with an electronic switching device; and cooling the electronic switching device by transferring heat though a thermally conductive connector directly connecting the electronic switching device to the liquid holding member and any liquid within the holding member; in which the thermally conductive member has and including the steps of conveying heat from the electronic switching device directly to the liquid holding member and any liquid contained within the liquid holding member through a base of the thermally conductive member that is sandwiched between the electronic switching device and the liquid holding member; and radiating heat from the electronic switching device into atmosphere through a radiating arm in direct thermal contact with the base of the thermally conductive member but spaced from the electronic switching device.

35. The beverage apparatus of claim 34 in which the beverage apparatus is a beverage maker and the liquid holding member is one of (a) an inlet water pipe connectable with a public source of water and a water tank, (b) a water tank for holding water to be mixed with a beverage ingredient to make a beverage, and (c) an outlet pipe for conveying water from the water tank to a beverage ingredient holder for making the beverage.

36. The beverage apparatus of claim 34 in which the beverage apparatus is a beverage dispenser and the liquid holding member is one of (a) a beverage holding tank, (b) an outlet pipe for conveying beverage out of the beverage holding tank.

37. The beverage apparatus of claim 34 in which the liquid operating apparatus operates on the liquid to achieve one of the operations of (a) heating the liquid, (b) cooling the liquid, (c) agitating the liquid, (d) whipping the liquid, (e) pumping the liquid, and (f) frothing the liquid when electrical power is applied by the electronic switching device.

* * * * *